United States Patent [19]

Boggs et al.

[11] 4,141,602
[45] Feb. 27, 1979

[54] TRACK-TYPE VEHICLE WHEEL HAVING CONTROLLED IMPACT RESISTANCE

[75] Inventors: Roger L. Boggs, East Peoria, Ill.; John W. Sogge, Cedar Rapids, Iowa

[73] Assignee: Caterpillar Tractor Co., Peoria, Ill.

[21] Appl. No.: 841,500

[22] Filed: Oct. 11, 1977

Related U.S. Application Data

[63] Continuation of Ser. No. 712,566, Aug. 9, 1976, Pat. No. 4,087,136.

[51] Int. Cl.² ............................................. B62D 55/12
[52] U.S. Cl. ................................... 305/57; 74/243 R; 267/182
[58] Field of Search ...................... 305/57, 56, 21, 24, 305/28, 5; 301/51; 267/182; 74/443, 229, 243 R

[56] References Cited

U.S. PATENT DOCUMENTS

| 1,046,969 | 12/1912 | Chaloner | 301/51 X |
| 3,889,550 | 6/1975 | Boggs et al. | 74/443 |

Primary Examiner—John P. Shannon
Attorney, Agent, or Firm—John L. James

[57] ABSTRACT

A wheel of a driven track of a track-type vehicle has a plurality of teeth connected to a hub. A plurality of annular springs is positioned in the openings of the teeth and actuated in response to associated plungers on the springs contacting a portion of the track. The springs controllably resist the impact forces of the track that are directed onto the wheel.

2 Claims, 3 Drawing Figures

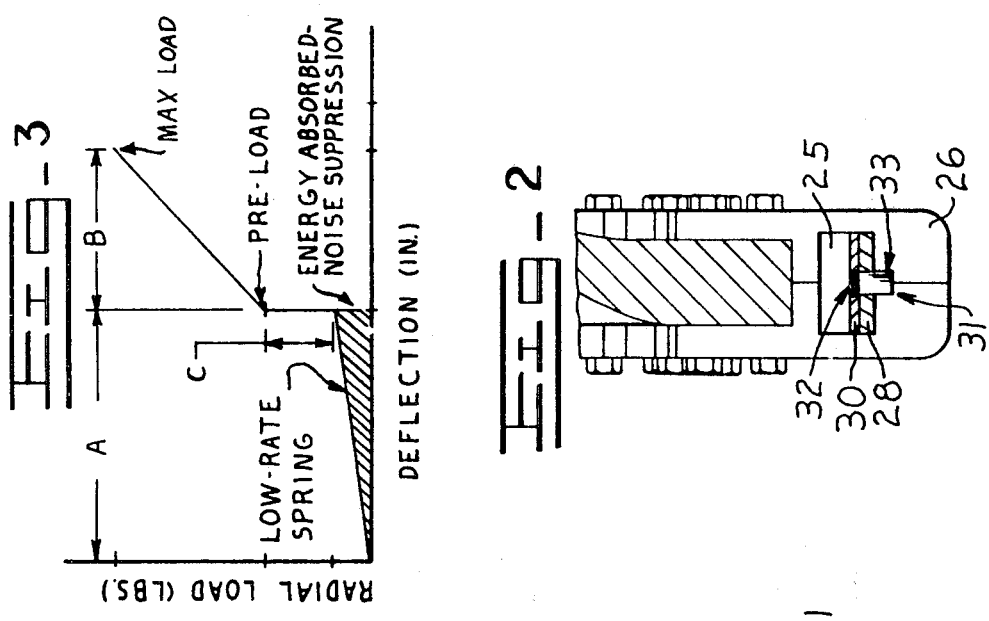

TRACK-TYPE VEHICLE WHEEL HAVING CONTROLLED IMPACT RESISTANCE

BACKGROUND OF THE INVENTION

This is a continuing application of U.S. Patent application Ser. No. 712,566, filed Aug. 9, 1976, which issued as U.S. Pat. No. 4,087,136 to Roger L. Boggs on May 2, 1978.

In the operation of track-type vehicles, the track impacts the sprocket and other wheels of the track assembly with relatively large forces. These impact forces cause an undesirable amount of noise. These impact forces and associated loads are also responsible for waste of labor and time in replacing elements of the track at undesirably high frequency and subjecting the operator and bystanders to an undesirable magnitude of sound impact. By reducing the impact loads by the apparatus of this invention, the track elements can be worn to a greater magnitude before replacement is necessary.

This invention therefore resides in apparatus for controllably resisting the impact forces on the track assembly wheels in response to operation of the track.

BRIEF DESCRIPTION OF THE DRAWINGS

FIG. 1 is a diagrammatic side view in partial section of a portion of a work vehicle having the apparatus of this invention;

FIG. 2 is a diagrammatic sectional view taken along line IV—IV of FIG. 1; and

FIG. 3 is a force vs. deflection curve of an example apparatus of this invention.

DETAILED DESCRIPTION

Referring to FIGS. 1 and 2, a work vehicle, for example a crawler tracker, has a continuous track 11 driven by a sprocket wheel 12 and being supported by an idler wheel and other wheels (not shown). The continuous track 11 is formed of a plurality of track shoes 13 interconnected by pins 14 that are covered by bushings 15. These elements are well known in the art as are the impact forces subjected onto the wheels 12 by the track 11. It should be understood, however, that the wheels of this invention can be any of the wheels of the track assembly and, for purposes of brevity, a sprocket wheel 12 is the only wheel shown.

The wheel 12 has a hub 20 connected to a plurality of teeth 26 by fasteners 24 and to the power train (not shown) of the vehicle. The wheel 12 has an outer surface 22. Each tooth has an opening 25 therethrough forming part of an annular aperture.

Where the wheel 12 is a sprocket wheel, as shown in the drawings, the outer surface of the wheel 12 has a plurality of arcuately spaced apart teeth 26. The teeth 26 are spaced one from the other by an intervening root area 27.

A first annular spring assembly 28 is positioned in the tooth openings 25 and is of a size sufficient for forcibly urging radially outwardly against the teeth 26 adjacent the tooth openings. The first spring assembly preferably has a plurality of generally radially extending openings 29 that are each positioned between adjacent teeth 26. In another embodiment of the first spring assembly 28 (not shown), said opening assembly 28 can be formed of two separate coaxial springs positioned side by side and spaced one from the other with said space providing said openings 29.

A second annular spring 30 is positioned in the tooth openings 25 and is of a size sufficient for forcibly urging against the first annular spring assembly 20. The first annular spring 28 is of a size sufficient for forcibly urging against the teeth 26 and is therefore preloaded. As shown, the springs 28, 30 are generally coaxial with the hub 20 with said second spring 30 being positioned between said first spring assembly 28 and said hub 20.

The springs 28, 30 are of a construction sufficient for requiring a greater force to move a portion of the first spring assembly 28 toward the hub 20 than the force required to move a portion of the second spring 30 toward the hub 20. The construction can be easily provided by forming the first spring assembly 28 with a thickness "T" that is greater than the thickness "t" of the second spring 30.

A plunger 31 is provided for each of the openings 29 of the first spring assembly 28. Each of the plungers 31 has first and second end portions 32, 33. The first end portion 32 is of a size sufficient for extending through the associated opening 29 of the first spring assembly 28 in slidable relationship thereto. The second end portion 33 is of a size sufficient for extending through the associated root area 27 (FIG. 1) in slidable relationship thereto.

The plungers 31 are each movable toward and from the hub 20 and are controllably biased outwardly by the second spring 30. The plungers 31 are preferably connected to the second spring 30 by any means known in the art for maintaining said plungers 31 with said second spring 30.

The first end portion of each plunger is of a length greater than the thickness "T" of the first annular spring assembly 28. The first and second end portions 32, 33 of each plunger are of respective length and construction sufficient for biasing portions of only the second spring 30 toward the hub 20 in response to initial movement of the plunger 31 toward the hub 20. At the fully inserted position of the plunger 31 by the track 11, portions of both springs 28, 30 are biased toward the hub 20 by a track pin bushing 15 and the outer end of the plunger is adjacent the associated root area 27.

FIGS. 1 and 2 show a plunger 31 of generally columnar configuration constructed for biasing of the first spring assembly 28 in response to and by direct contact with the bushing 15.

In operation of the apparatus, the track bushing 15 contacts the plunger 31 and biases the plunger 31 toward the hub 20. This biasing force on the plunger 31 is first resisted by the force of the first spring 30, thereby preventing the track 11 from slapping wheel 10 with resultant undesirable noise. Further movement of the track 11 toward the hub 20 in response to higher than normal loading causes portions of the second spring assembly to be biased toward the hub 20 with resultant greater resistance being exerted against movement of the track 11 toward said hub 20. The second spring resisting forces thereby function to drastically reduce bushing impact loads which sometimes cause crushing and damage of the bushings 15. In some constructions, impact loads of the track 11 are expected to be reduced by about 50% by the apparatus of this invention.

FIG. 5 shows a force vs. deflection curve which illustrates the force and second spring deflection "A" and the forces required for resultant deflection of the first spring "B." This assembly therefore has a dual spring rate. As can be seen, additional forces "C" of a preselected magnitude "C" are required prior to the initial biasing of the first spring after the second spring is fully deflected. This construction enables the track and sprocket to maintain a matched relationship during normal operations. The resisting force "C" is provided by preloading spring 28, as set forth above.

Other aspects, objects, and advantages of this invention can be obtained from a study of the drawings, the disclosure, and the appended claims.

The embodiments of the invention in which an exclusive property or privilege is claimed are defined as follows:

1. A wheel of a track-type vehicle having a track, comprising:

a hub;

a plurality of arcuately spaced apart teeth each having an opening and being connected to said hub;

a first annular spring assembly having a plurality of generally radially extending openings and being positioned in said openings of the teeth, each of said openings of the first spring assembly being positioned between adjacent teeth;

a second annular spring assembly positioned in said openings of the teeth and forcibly urging against said first spring assembly; and a plurality of plungers, each extending through an associated opening of the first spring assembly and movable towards and from said hub and controllably biased outwardly by the second spring assembly, said teeth being spaced apart a distance sufficient for receiving a pin bushing of the associated track between adjacent teeth, said pin bushing contacting said first annular spring and a selected one of said plungers and biasing a portion of said second spring with said plunger a preselected distance toward said hub in response to said contact.

2. An apparatus, as set forth in claim 1, wherein each plunger has first and second end portions of generally common diameter.

* * * * *